Figure 1:
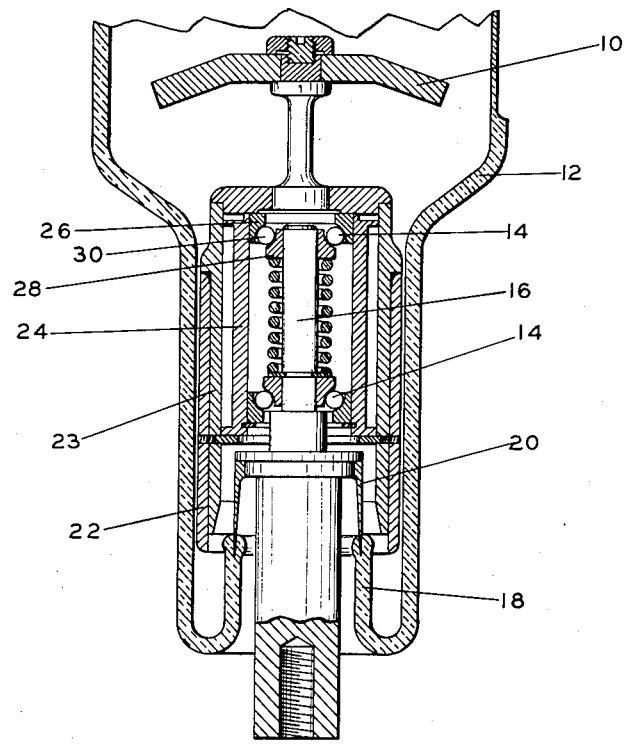

July 10, 1956   Z. J. ATLEE   2,754,168
LUBRICATING METHOD
Filed June 2, 1953

INVENTOR.
ZED J. ATLEE
BY
Buckhorn and Cheatham
ATTORNEY

United States Patent Office 2,754,168
Patented July 10, 1956

2,754,168

LUBRICATING METHOD

Zed J. Atlee, Chicago, Ill., assignor to Dunlee Corporation, Chicago, Ill., a corporation of Illinois Application June 2, 1953, Serial No. 359,163

4 Claims. (Cl. 316—19)

The present invention relates to lubrication of bearings for structures operating in a high vacuum and relates in particular to a method of forming a lubricating coating upon the working surfaces of bearings of rotating anode X-ray tubes.

Ordinary lubricants cannot be used to lubricate bearing structures operating in highly exacuated environments such as, for example, in X-ray tubes. The relatively high vapor pressure of ordinary greases and oils causes them to evaporate, destroying the vacuum, the vapors frequently migrating and condensing upon other portions of the tube which may disturb if not disrupt the operation of the tube.

It has been found that the bearings may be lubricated by providing a thin coating of certain soft metals or inorganic compounds upon the working surfaces of the bearings. Such materials are not normally tacky or adherent to bearing surfaces and heretofore a coating of the lubricant has generally been formed by tumbling the bearings with a mass of the powdered lubricating material or otherwise rubbing the working surfaces with the lubricating material to transfer or to form a film of the material upon the bearings prior to the assembly of the bearings within the envelope of the X-ray tube. In other instances the tubes have been completely assembled with the bearing surfaces bare, and a lubricating material flashed within the tube after it has been evacuated whereby some of the lubricating material condenses upon the working surfaces of the bearings. The latter of these methods entails the provision of exceedingly complex structure within the X-ray tube, and the former of these methods is not entirely satisfactory inasmuch as air and other occluded gases are frequently trapped between the lubricating material and the working surfaces of the bearings, and which gases slowly diffuse out during operation of the tube to disrupt the vacuum therein.

Accordingly, it is a principal object of the present invention to provide a new and improved method of forming a layer of lubricating material upon the working surfaces of a bearing operating within an evacuated envelope.

More particularly, it is an object of the invention to provide a new and improved method of providing lubricating layers on the working surfaces of the bearings of a rotating anode X-ray tube.

Other objects and advantages of the invention will become more apparent hereinafter.

In accordance with the present invention, a mixture of a grease and the lubricating material in a finely divided state is placed upon various portions of the surfaces of the bearings prior to the assembly of the bearings in the X-ray tube. The tube is thereafter sealed and evacuated and heated to draw off the occluded gases from the various parts of the X-ray tube structure. Simultaneously with the evacuation and heating of the tube the anode is slowly driven whereby the motion between the various bearing races and roller elements causes the lubricating medium to distribute in a thin, smooth coating over the entire working surfaces of the bearings.

For a more complete description of the invention, reference is made to the following description taken in connection with the accompanying drawing wherein Fig. 1 is a sectional view through the anode portion of an X-ray tube showing the supporting structure therefor.

To illustrate the invention, there is shown an X-ray tube or generator comprising a rotating anode 10 supported within a sealed envelope 12 upon bearings 14 formed of a ferrous alloy. It will be apparent, however, as the description proceeds, that the invention is not limited to the structure shown nor necessarily to X-ray tubes or generators.

The anode 10 is supported by the bearings 14 on a spindle 16 which is supported on the reentrant portion 18 of the envelope 12 through a collar 20 secured to the reentrant portion through a conventional glass-to-metal seal.

The anode 10 comprises a cylindrical body comprising a blackened copper sleeve 22 secured as by soldering to a tubular rotor 23 of magnetic steel. Mounted within the rotor 23 is a bearing supporting sleeve 24. The bearings 14 each comprises an outer bearing race 26 mounted on the supporting sleeve 24 and an inner bearing race 28 mounted on the spindle 16 and a plurality of roller elements or ball bearings 30 disposed between the outer and inner races. The particular anode structure shown is more fully described in my copending patent application Serial No. 363,987, filed June 25, 1953.

As mentioned before, the ordinary high vacuum lubricants are non-tacky and do not readily adhere to the surface of the bearings. In accordance with the present invention, the material which is to be applied to the bearings as a lubricating medium is first reduced to a finely divided state. Suitable high vacuum lubricants are well known to those skilled in the art and include, for example, such inorganic compounds as molybdenum sulfide, boron nitride, and soft metals such as gold, lead, indium and silver. The finely divided high vacuum lubricant is mixed with a grease which will adhere to the surface of the bearing structure, the proportion of the lubricating material in the mixture being as high as possible without destroying the adhesive quality of the mixture. Preferably, a vacuum grease such as a silicone grease is used since such greases have a relatively low vapor pressure and will not volatilize to any great extent even in a high vacuum except at very high temperatures. It should be understood that the grease is merely a vehicle or carrier for the high vacuum lubricant. As the anode structure is assembled during the process of manufacturing a tube, a small amount of the mixture prepared as described above is applied to certain portions of the working surfaces of the bearings and races, as, for example, a visible trace to every other ball bearing 30. When the tube has been completely assembled, the envelope 12 is exhausted and the anode structure then heated by means of a high frequency heating apparatus to a temperature of between 400° C. and 600° C. to drive off occluded gases from the anode parts. As the heating is started, and particularly before any substantial quantity of the grease is carbonized or otherwise decomposed, a stator (not shown) mounted externally of the envelope 10 is energized to cause the anode to rotate at a relatively slow rate of speed. This rotation causes the ball bearings 30 and races 26, 28 to move relative to one another and also causes the lubricating medium to distribute evenly over the entire working surfaces of the bearings in a thin, smooth coating. As the heating continues, the grease will be volatilized or decomposed leaving only the lubricating material upon the working surfaces of the bearings. The tube is then ready to be operated in the usual manner.

Preferably, a minimum amount of the mixture of grease and lubricant is applied to the bearings for the reason that if an excessive amount of grease is applied, the amount which vaporizes and condenses in other portions of the X-ray tube may interfere with, if not entirely disrupt, the operation of the tube. For the same reason, a silicone grease is preferred in that it has a relatively low volatility whereby it may not entirely vaporize upon evacuation of the tube. Also, the operation of the tube is not affected as greatly by the condensation of the silicone grease or its decomposition products upon various parts thereof as by the ordinary hydrocarbon lubricants.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a method of manufacturing X-ray tubes including a rotating electrode mounted within an envelope and supported by a bearing formed of a ferrous alloy, said bearing including races and roller elements between the races; the steps comprising mixing a quantity of a finely divided non-tacky high vacuum lubricant with a silicone grease to form a uniform mixture capable of adhering to the surface of said bearing, applying a small quantity of said mixture to portions of the working surfaces of said races and roller elements, assembling said electrode in said envelope and sealing and evacuating said envelope, and thereafter heating said electrode and bearing to about 400° C. to drive off occluded gases therefrom and simultaneously causing said electrode to rotate slowly whereby said roller elements will roll upon said races to distribute said lubricant in a smooth, even coating over the working surfaces of said races and roller elements.

2. In a method of forming a layer of a normally non-tacky high vacuum lubricant upon the working surfaces of a bearing, including races and roller elements between the races, for operation in a high vacuum; the steps comprising mixing fine particles of said lubricant with a vacuum grease, placing a trace of the mixture so formed on portions of the working surfaces of said races and roller elements, assembling said bearing in an envelope and sealing and evacuating said envelope, thereafter heating said bearing to drive off occluded gases, and before a substantial portion of the vacuum grease on said bearings has volatilized or decomposed, causing said roller elements to roll on said races at a relatively slow rate of speed whereby said lubricating material will be distributed in a smooth, even coating over the working surfaces of said bearing.

3. The process of claim 1 wherein said lubricant is gold.

4. The process of claim 2 wherein said lubricant is gold.

References Cited in the file of this patent

UNITED STATES PATENTS

| Number | Name | Date |
|---|---|---|
| 2,242,101 | Atlee | May 13, 1941 |
| 2,280,886 | Brace | Apr. 28, 1942 |
| 2,315,280 | Skehan et al. | Mar. 30, 1943 |
| 2,329,317 | Atlee | Sept. 14, 1943 |
| 2,466,642 | Larsen | Apr. 5, 1949 |
| 2,625,664 | Agule | Jan. 13, 1953 |